United States Patent
Uehara et al.

[11] Patent Number: 5,877,454
[45] Date of Patent: Mar. 2, 1999

[54] VEHICLE LOAD MEASURING APPARATUS AND METHOD

[75] Inventors: Kazuyasu Uehara; Shinya Matsuura, both of Tokyo; Takaaki Makita, Kawasaki, all of Japan

[73] Assignee: Mitsubishi Jidosha Kogyo Kabushiki Kaisha, Tokyo, Japan

[21] Appl. No.: 882,116

[22] Filed: Jun. 25, 1997

[30] Foreign Application Priority Data

Jun. 25, 1996 [JP] Japan ..................... 8-183990

[51] Int. Cl.[6] .................. G01G 19/12; B06P 5/00
[52] U.S. Cl. .................. 177/1; 177/136; 73/1.13
[58] Field of Search .................. 177/1, 50, 136, 177/137, 141; 73/1.13

[56] References Cited

U.S. PATENT DOCUMENTS 4,529,050   7/1985   Mosher et al. .................. 177/1
5,058,422  10/1991   Shimauchi .................. 73/1.13

FOREIGN PATENT DOCUMENTS

669759 U    9/1994   Japan.
93 06442 A1 4/1993   WIPO.

Primary Examiner—Randy W. Gibson

[57] ABSTRACT

An apparatus for measuring a weight of load on a vehicle or a vehicle weight capable of easily compensating changes in load sensor outputs caused by temperature changes. When changes in load sensors outputs are so small such changes are determined as caused by temperature change, and a compensation process is made to output computed load values which were taken before occurrence of temperature change against the up-dated sensor detection outputs. On the other hand, when the changes are greater, the computed load values are up-dated to the up-date sensor detection outputs, thereby an accurate information of the change in the load is detected.

14 Claims, 7 Drawing Sheets

VEHICLE LOAD MEASURING APPARATUS AND METHOD

In vehicles for loading goods thereon, such as trucks, this invention relates to a vehicle load measuring apparatus for measuring, for example, a load or a total vehicle weight by adding a vehicle weight to the load, and specifically to a vehicle load measuring apparatus by disposing load sensors in proper positions of components of the vehicle to detect the load of the vehicle, to measure, for example, the load and the total weight of the vehicle.

BACKGROUND OF THE INVENTION

Recently, in order to prevent an excess loading on large vehicles, such as trucks, it has been proposed to incorporate a load measuring apparatus directly in the vehicle body to enable a driver or loading people to easily determine a load.

For example, a vehicle load measuring apparatus was proposed in Japanese Utility Model Laid-Open Publication No. 6-69759, such as shown in FIG. 5. Here, a suspension structure of a large vehicle, having leaf springs 26a and 26b, has load sensors of a magnetostrictive type sensor or a distortion sensor mounted on members which receive a load given by a weight of loaded goods. More specifically, at the side of front wheels 25, sensors $7a_1$ and $7a_2$ are attached to a shackle pin 34 connecting a bracket 31 and a shackle 32 as shown in FIG. 6. Further, at the side of rear wheels 20, sensors $7b_L$, $7b_R$ are attached to a trunnion shaft 3 supported by a trunnion bracket 2A load applied to these members can be detected by these sensors, to measure the load and/or the vehicle weight.

Specifically, as shown in FIG. 5 and FIG. 6, the load at the side of the front wheels 25 is detected in such a manner that an axial hole 6 is provided along an axial direction on a center line of the shackle pin 34 connecting the suspension (leaf spring) 26a of the vehicle and the bracket 31 on the side of a loading platform frame 1 by way of a bush 33. A pair of load sensors $7a_1$, $7a_2$ are disposed in the axial hole 6 to detect distortion of the shackle pin 34 which is deformed in proportion to the load above the spring of the vehicle at the side of front wheels 25.

The pair of load sensors $7a_1$, $7a_2$ are respectively mounted on the right and left shackle pins 34 each disposed at right side and left side of the vehicle, and accordingly in this conventional apparatus, a sum of a front right axle sensor output $f_{FR}$ and a front left axle sensor output $f_{FL}$ are respectively a sum of outputs of the pair of load sensors $7a_1$, $7a_2$ mounted on the right and left shackle pins 34.

On the other hand, the load at the side of rear wheels 20 is detected by the load sensors $7b_L$, $7b_R$. As shown in FIG. 5 and FIG. 7, axial holes 6', 6' are provided along an axial direction on a central line of a horizontal axle 3a of the trunnion shaft 3, which is engaged with the trunnion bracket 2 attached to the loading platform frame 1, and the load sensors $7b_L$ and $7b_R$ are disposed in the axial holes 6', 6' to detect distortion of the trunnion shaft 3, which is deformed in proportion to the load above the spring of the vehicle at the side of rear wheels 20. Output signals respectively provided by the sensors $7a_1$, $7a_2$, $7b_L$, and $7b_R$ (collectively, 7a, 7b) are amplified by amplifiers 41a, 41b to obtain the load above the springs of the vehicle. Then, computation process of adding a load below the springs of the vehicle is carried out by a controller 40, to measure the vehicle load and/or the load, and, if necessary, the measured value is displayed on a display device 42.

In the foregoing conventional apparatus, a sensor output of the load sensor $7b_L$ is a rear left axle sensor output $f_{RL}$, and a sensor output of the load sensor $7b_R$ is a rear right axle sensor output $f_{RR}$.

Specifically, the controller 40 performs a predetermined computation process based on the detected signals, representative of the vehicle load, a switching signal from each switch which will be described hereinafter, and an input signal, such as, a signal representing a vehicle speed detected and input by a vehicle speed sensor 47. The resulted signals representative of the load and the total weight of the vehicle are sent to the display device 42 in a driver's cabin.

However, with the above-described conventional apparatus, the sensors 7a, 7b are mounted on and through the shackle pin 34 and the trunnion shaft 3 which receive the weight of the vehicle. Since these members need to receive the weight of the vehicle, they are disposed in the vicinity of various heat sources, such as an engine, an exhaust pipe and the like, located at the lower portion of the vehicle body. These heats are transferred to the shackle pin 34 and the trunnion shaft 3. Thus, such heat conduction before and after running of the vehicle causes changes in a distortion factor despite the fact that the weight of load is the same, and results in causing changes in a computed load value, which becomes an error factor. And, even with a layout of positioning the heat sources remote from the shackle pin 34 and the trunnion shaft 3, there will be cases where the vehicle is subjected to the radiant heat from the ground surfaces or the atmospheric temperature, while the vehicle is being stopped or running, and this will cause changes in the distortion factor despite the fact that the weight of load is the same, similar to the above-described case, and as a result, there will be changes in the computed load value.

Such phenomenon of having fluctuations in the computed load value due to temperature changes, despite a fixed weight of load, occurs not only with the use of the magnetostrictive type sensors or the distortion sensors as in the conventional art, but also with other types of load sensors (for example, a sensor for sensing an inner pressure of an air spring).

In view of the above-described drawbacks of the prior art, it is an object of the present invention to provide a vehicle load measuring apparatus capable of making an accurate measurement of a load weight or a vehicle weight, even when there are temperature changes.

SUMMARY OF THE INVENTION

To achieve the above object, the invention has been made by taking note of the fact that changes in the load sensors' outputs caused by temperature change are generally smaller than changes in the load sensors' outputs based on changes in the load by unloading. Thus, according to the present invention, in a vehicle load information measuring apparatus including load sensors for detecting a load information of the vehicle, the sensors being mounted on members which receive a weight of the vehicle, the apparatus comprises, memory means for storing load detection signals detected by the load sensors, load information control means for computing the load information of the vehicle based on the load detection signals stored in the memory means according to a predetermined computing equation, and outputting a computed load value; wherein the load information control means computes a load information ($W_0$) based on load detection signals ($f_{FR0}$, $f_{FL0}$, $f_{RR0}$, $f_{RL0}$) at a first point of time and stores it, makes computation of a load information (W) based on load detection signals ($f_{FR}$, $f_{FL}$, $f_{RR}$, $f_{RL}$) at a second point of time after the lapse of a predetermined time from the first point of time, makes computation of changes ($\Delta f_{FR}$, $\Delta f_{FL}$, $\Delta f_{RR}$, $\Delta f_{RL}$) between the load detection signals ($f_{FR0}$, $f_{FL0}$, $f_{RR0}$, $f_{RL0}$) at the first point of time and the load detection signals ($f_{FR}$, $f_{FL}$, $f_{RR}$, $f_{RL}$) at the second point of time or a change ($|W_0-W|$) between the load information ($W_0$) of the first point of time and the load information (W) of the second point of time, and if the changes ($\Delta f_{FR}$, $\Delta f_{FL}$, $\Delta f_{RR}$, $\Delta f_{RL}$) of the load detection signals or the change ($|W_0-W|$) of the load information is below a first predetermined value, the arithmetic computation based on the predetermined computing equation is compensated so that the computed load value outputted at the second point of time is not up-dated to the load information (W) based on the load detection signals ($f_{FR}$, $f_{FL}$, $f_{RR}$, $f_{RL}$) of the second point of time. At this time, the load information control means may make the above compensation of computation to maintain the load information ($W_0$) of the first point of time as the computed load value outputted at the second point of time.

As such, when an output change is small as in the case of change of sensor detection outputs caused by a temperature change, a computed load value prior to temperature change is outputted even against the up-dated sensors' detection outputs, thereby to reliably eliminate errors caused by temperature change, which results in providing an improvement of measurement precision. Further, when there is a great change in the load, load change is accurately measured and the computed load value is up-dated accordingly, thereby the apparatus is excellent in practical use.

Further, the load information control means may be so configured to repeatedly make computation of the changes ($\Delta f_{FR}$, $\Delta f_{FL}$, $\Delta f_{RR}$, $\Delta f_{RL}$) of the load detection signals or the change ($|W_0-W|$) of the load information at the above-described every predetermined time. In this case, the predetermined computing equation is so defined to make computation of the load information (W) at the second point of time based on the load information ($W_0$) of the first point of time and the changes ($f_{FR}$, $f_{FL}$, $f_{RR}$, $f_{RL}$) of the load detection signals of the second point of time, and the compensation is so made that the changes ($\Delta f_{FR}$, $\Delta f_{FL}$, $\Delta f_{RR}$, $\Delta f_{RL}$) of the load detection signals become zero (0). More specifically, the load information control means effects updating of the load detection signals ($f_{FR0}$, $f_{FL0}$, $f_{RR0}$, $f_{RL0}$) of the first point of time stored in the memory means to the load detection signals ($f_{FR}$, $f_{FL}$, $f_{RR}$, $f_{RL}$) of the second point of time.

By arranging the apparatus as described above, it is now possible to make a compensation process for temperature change accurately with the change of times, and the system is simplified.

Moreover, it is desirable to have a plurality of load sensors mounted on the vehicle, and the load information control means is so arranged to effect the above-described compensation when the quantities of change ($\Delta f_{FR}$, $\Delta f_{FL}$, $\Delta f_{RR}$, $\Delta f_{RL}$) of all the load detection signals from the load sensors are below the first predetermined value.

With this arrangement, the load information can be detected accurately even when the goods are loaded on a position displaced to back, front, right or left of the vehicle, and an erroneous temperature compensation can be avoided.

Or, the apparatus may be configured to have an additional temperature detection means for detecting a temperature around the load sensors, and the load information control means is so arranged that, when a temperature change ($|T_0-T|$) between a temperature ($T_0$) detected at the first point of time and a temperature (T) detected at the second point time is above a third predetermined value, the changes ($\Delta f_{FR}$, $\Delta f_{FL}$, $\Delta f_{RR}$, $\Delta f_{RL}$) of the load detection signals or the change ($|W_0-W|$) of the load information are compared with the second predetermined value which is greater than the first predetermined value, instead of comparing with the first predetermined value. However, even with this arrangement, it is desirable to have the plurality of load sensors mounted on the vehicle, and the load information control means is configured to effect the above-described compensation when the changes ($\Delta f_{FR}$, $\Delta f_{FL}$, $\Delta f_{RR}$, $\Delta f_{RL}$) of the load detection signals of the load sensors are below the second predetermined value.

According to present invention, a method of measuring a vehicle load, comprises:

detecting first load information indicative of a vehicle load at a first point of time by a load detection sensor, storing the detected first load information, detecting second load information indicative of the vehicle load at a second point of time after the first point of time by the load detection sensor, calculating a difference between the first and second load information, comparing the calculated difference with a first predetermined value, replacing the stored detected first load information with the second load information when the calculated difference is smaller than the first predetermined value, and calculating a vehicle load value based on the replaced second load information.

The method further comprises:

detecting first temperature information indicative of a temperature of the load detection sensor at the first point of time, detecting second temperature information indicative of a temperature of the load detection sensor at the second point of time, determining whether a difference between the first and second temperature information with a second predetermined value, and executing the comparing step when said determined difference is smaller than the second predetermined value.

Yet further, the method comprises:

comparing the calculated difference with a third predetermined value in place of comparing the calculated difference with the first predetermined value when determined difference between the first and second temperature information is smaller than the second predetermined value.

Even still further, the method comprises:

calculating the vehicle load value based on the calculated difference between the first and second load information when said calculated difference between the first and second load information is greater than the first predetermined value.

Yet still further, the method comprises:

calculating the vehicle load value based on the calculated difference between the first and second load information when the calculated difference between the first and second load information is greater than the third predetermined value.

With the above-described arrangement, a threshold value for temperature compensation can be set accurately according to a degree of temperature change, thereby, accuracy of temperature compensation is further improved.

DETAILED DESCRIPTION OF EMBODIMENT

A preferred embodiment of the present invention will be described in detail by referring to the accompanying drawings, as illustrative of the present invention. However, it should be noted that dimensions, materials and shapes of components and their relative positions are only illustrative of this invention and are not meant to limit the scope of the invention, unless otherwise specifically described.

Figure 1:
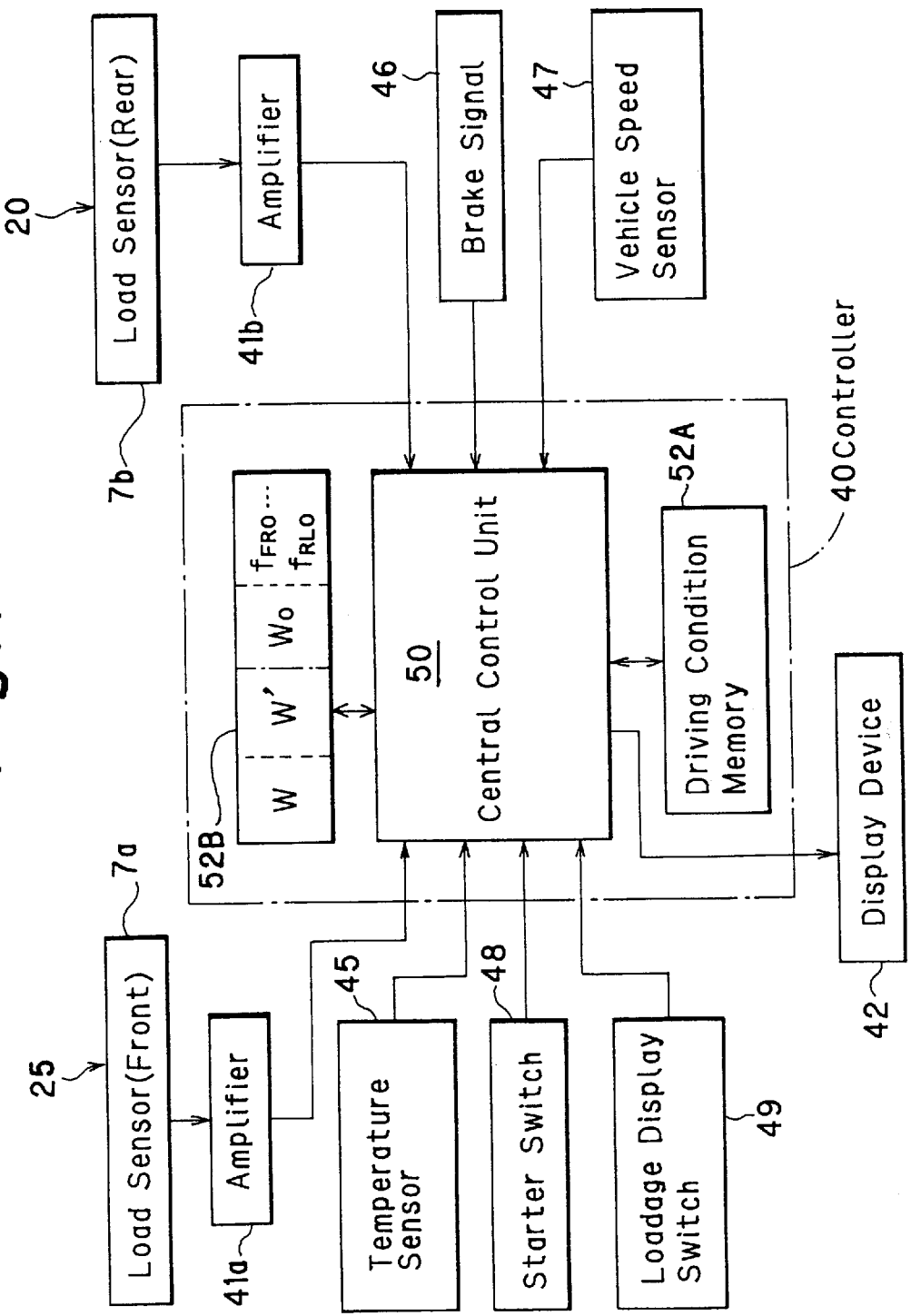
FIG. 1 is a block diagram of the vehicle load measuring apparatus of an embodiment of the present invention.
Figure 6:
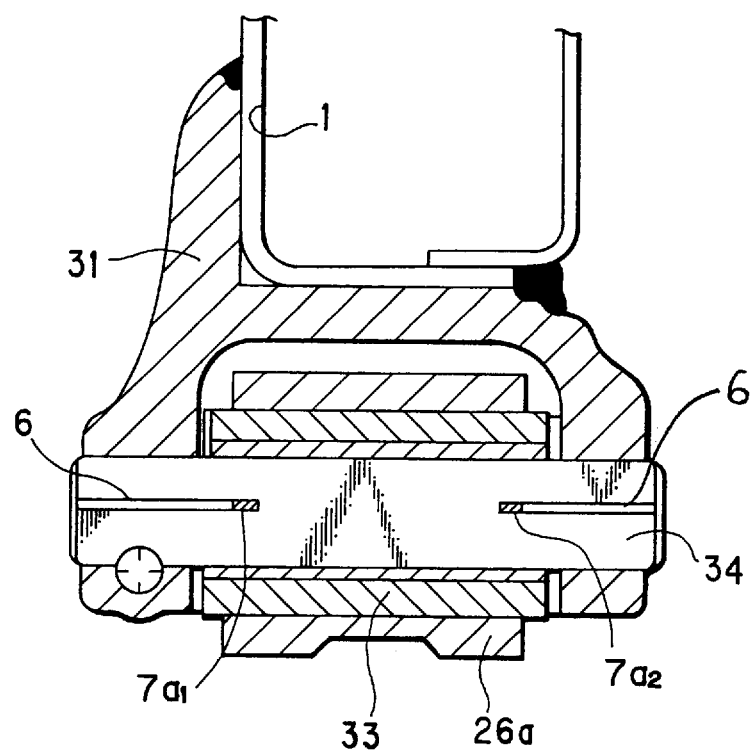
FIG. 6 is a sectional view showing the vicinity of the place where the load sensors for the front wheels side are mounted in the vehicle of FIG. 5.
Figure 7:
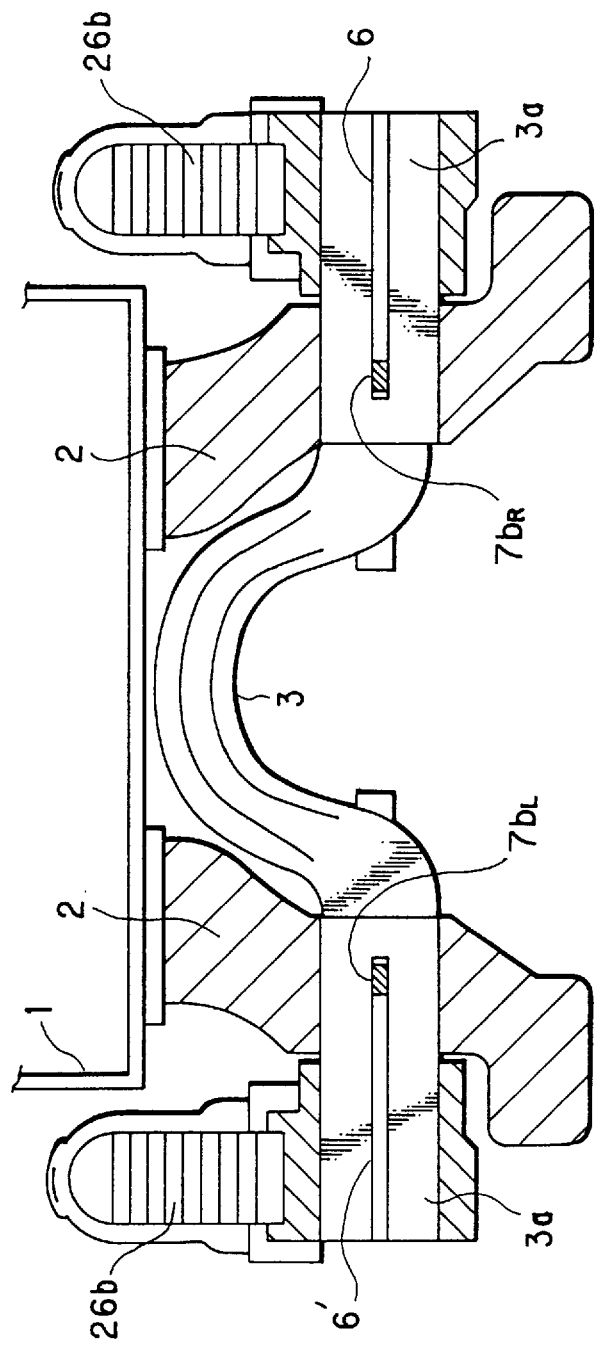
FIG. 7 is a sectional view showing the vicinity of the place where the load sensors for the rear wheels side are mounted in the vehicle of FIG. 5.

FIG. 1 shows a block diagram of the vehicle load measuring apparatus as an embodiment of this invention. Numerals 7a, 7b designate load sensors comprising magnetostrictive sensors, and, as described earlier, the load sensor 7a on the front wheels side is inserted into an axial hole of a shackle pin 34, and the load sensor 7b on the rear wheels side is inserted into a horizontal axis 6 of a trunnion shaft 3 as shown in FIG. 6. Detected vehicle load signals from these sensors 7a, 7b are amplified and subjected to V/f conversion by amplifiers 41a, 41b to be input into a controller 40.

To the controller 40, various signals are input from, such as, a brake signal detection switch 46, a vehicle speed sensor 47, a starter switch 48, and a load display switch 49.

Temperature detection sensors 45 are each inserted into the axial hole 6 of the shackle pin 34 for the front wheels side, and into the horizontal axle 6' of the trunnion shaft 3 for the rear wheels side, respectively, with the load sensors 7a, 7b, to precisely detect temperatures around these sensors.

For the sake of simplicity, the embodiment, which will be described hereinafter, has one temperature detection sensor 45 for describing its function and operation, but originally it is preferable to provide the temperature detection sensor for each of the load sensors 7a, 7b.

The starter switch 48, upon being turned-ON, provides a trigger signal to the controller 40 to start measuring the vehicle load and various driving conditions of the vehicle.

The load display switch 49, upon being turned-ON, changes the display in a display device 42 to a load display, only when the vehicle speed signal from the vehicle speed sensor 47 is "0".

As described above, numeral 42 is the display device adapted to display the vehicle load including a load of the vehicle and a total weight of the vehicle, only when the vehicle speed signal is "0", and, when the vehicle speed signal is other than "0", namely, while the vehicle is running, the display can be switched to display various driving conditions of the vehicle and other information, so as to function as a multi-display system.

The controller 40 comprises a central control unit 50 comprising a CPU, a driving condition memory 52A as memory means for receiving various sensor outputs and storing various driving conditions (various sensor outputs) of the vehicle, and load memory means 52B for storing the vehicle load including the load on the vehicle and the total weight of the vehicle, the information of which has been arithmetically processed in the central control unit 50 upon its receiving of ON signal from the load display switch 49 and "0" signal from the vehicle speed detection sensor.

In the load memory means 52B, storage areas are provided for storing the computed load value W, as well as a computed load value W' and the computed load value $W_0$ which have been detected repeatedly at a time of 10 seconds before the detection timing.

Next, the order of steps to be taken for processing a computation of the load based on the embodiment will be described by referring to FIG. 2 to FIG. 4.

Figure 2:
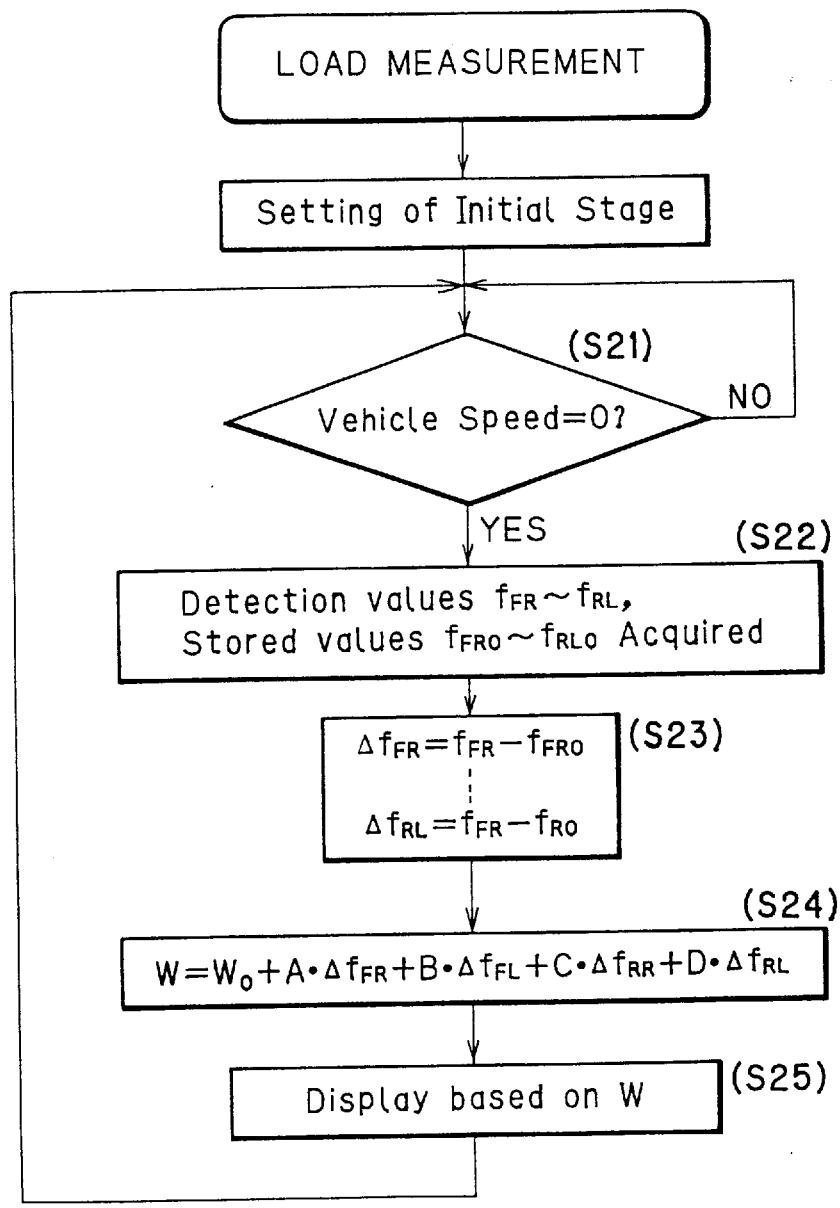
FIG. 2 is a flow chart showing an order of steps taken for carrying out the load measurement based on the embodiment of FIG. 1.

FIG. 2 shows a load measuring routine, and a brief description of the order of steps will be made hereinbelow. Subsequent to setting to the initializing stage, the state of vehicle of whether it is being stopped or running is detected by means of the vehicle speed sensor 47. The load measurement is not carried out while the vehicle is running. (S21)

On the other hand, when the vehicle is in the stopped and stationary state, detection outputs ($f_{FR}$, $f_{FL}$, $f_{RR}$, $f_{RL}$) of the load sensors 7a, 7b are respectively acquired (S22), and differences between these detection outputs and the stored sensor output values ($f_{FR0}$, $F_{FL0}$, $f_{RR0}$, $f_{RL0}$) are taken as follows: ($\Delta f_{FR}=(f_{FR}-f_{FR0})$, $\Delta f_{FL}=(f_{FL}-f_{FL0})$, $\Delta f_{RR}=(f_{RR}-f_{RR0})$, $\Delta f_{RL}=(f_{RL}-f_{RL0})$). (S23)

As will be expressed in the below-mentioned Equation (1), each difference of $\Delta f_{FR}=\ldots$ is multiplied by a transform constant (A, B, C, and D) of the load value, respectively, and to the resulted value, the stored computed load value $W_0$ is added, to obtain the up-dated computed value W. (S24)

$$W=W_0+A\Delta f_{FR}+B\Delta f_{FL}+C\Delta f_{RR}+D\Delta f_{RL} \qquad (1)$$

The symbols A, B, C and D each is a constant for converting the detected outputs (frequency) of the load sensors 7a, 7b into the computed load value.

In other words, the up-dated computed load value W is obtained by first deriving load changes from the changes in sensor outputs that have occurred from the point of time of storing the computed load value, and the load changes are added to the stored computed load value.

Thereafter, the display in the display device 42 is up-dated (S25) based on the up-dated computed value W, and the steps S21 et seq. will be repeated.

Figure 3:
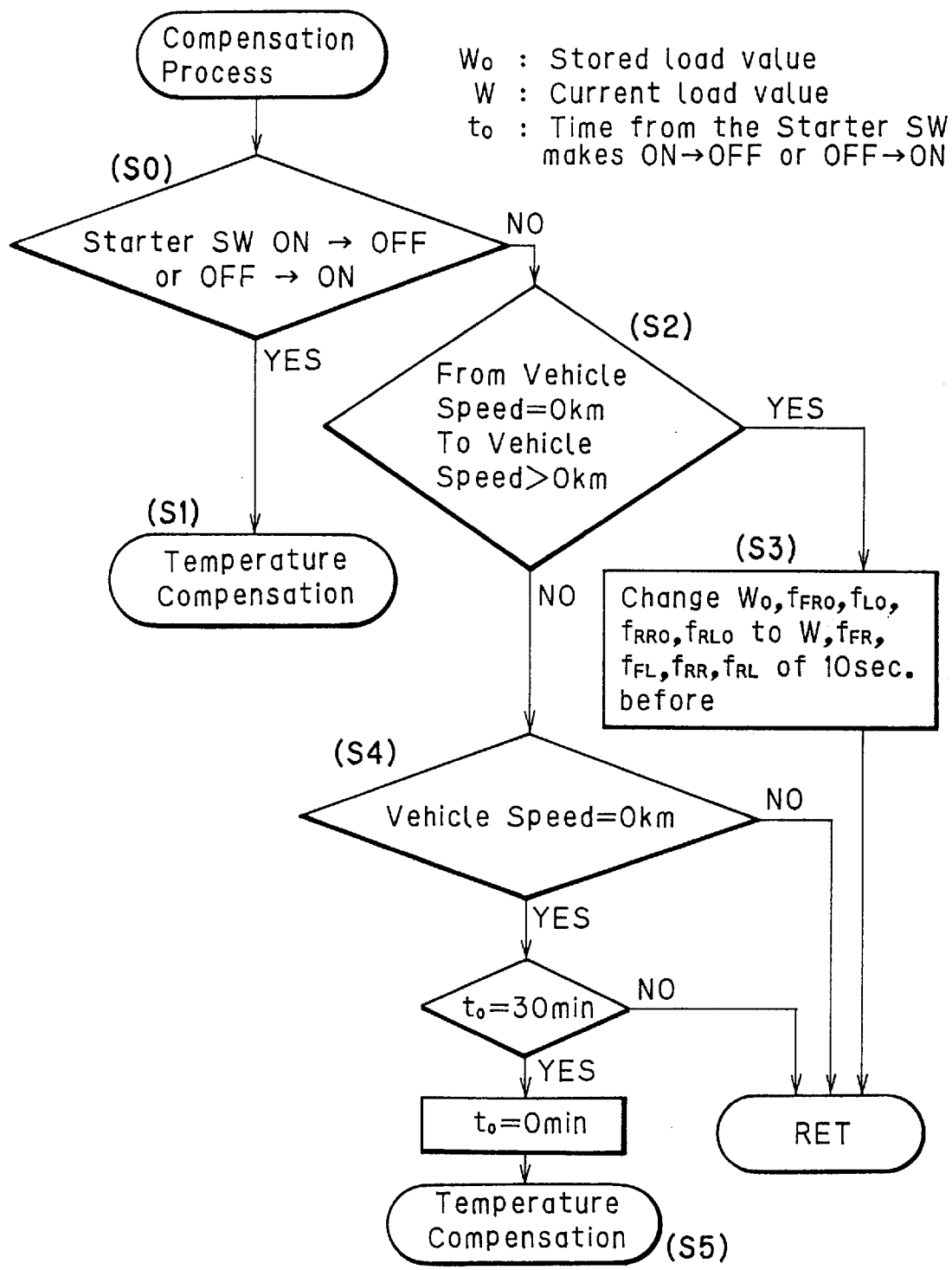
FIG. 3 is a flow chart showing an order of steps taken for effecting the compensation process.

FIG. 3 is a flow chart which shows the compensation process carried out in parallel with the above-described load measuring routine. Initially, when the starter switch 48 is switched to either ON→OFF, or OFF→ON, the temperature compensation process shown in FIG. 4 is carried out. (A first temperature compensation.) (S1)

Then, whether the vehicle speed has been changed from 0 km (stopped state) to [>0 km] (running state) is determined by means of the vehicle speed sensor 47. (S2) When the speed has been changed to running speed, the stored computed load value $W_0$, which will be described hereinafter, is changed to the computed load value W which was at the time of 10 seconds before the change of the speed, and stored. At the same time, the stored sensor output values $f_{FR0}$, $f_{FL0}$, $f_{RR0}$, $f_{RL0}$ are also changed to the sensor detection outputs of $f_{FR}$, $f_{FL}$, $f_{RR}$, $f_{RL}$ which were at the time of 10 seconds before the change of the speed, and they are stored. (S3)

The reason for storing the computed load value and the sensor outputs which were at immediately before (10 seconds before) starting of the vehicle, as $W_0$, $f_{FR0}$, $f_{FL0}$, $f_{RR0}$, $f_{RL0}$, is that, in this manner, the state of load upon completion of loading can be stored without receiving any influences of the vehicle's behavior at the time of starting, and these values can be utilized as reference values for load measurement at the time of subsequent re-loading.

When the vehicle speed is not in the starting state, whether the vehicle speed is in the running state is determined. If the vehicle is in the running state, temperature compensation is not made, but the above-described steps are repeated (S4), since distortion by vibration of the vehicle is applied to the load sensors 7a, 7b.

On the other hand, when the vehicle is in the stopped condition, a second temperature compensation is made after the first temperature compensation. Specifically, after the starter switch 48 has been switched to ON→OFF or OFF→ON, it is determined whether or not 30 minutes ($t_0$=30 minutes) have lapsed after such switching, and at the time of after the lapse of 30 minutes, $t_0$ is reset to 0 minute, and proceed to make the second temperature compensation. (S5)

Then, the above-described steps are repeated, and during the vehicle being stopped, the temperature compensation is repeated at every time after the lapse of $t_0$=30 minutes.

Next, the steps to be taken for temperature compensation will be described by referring to FIG. 4.

Figure 4:
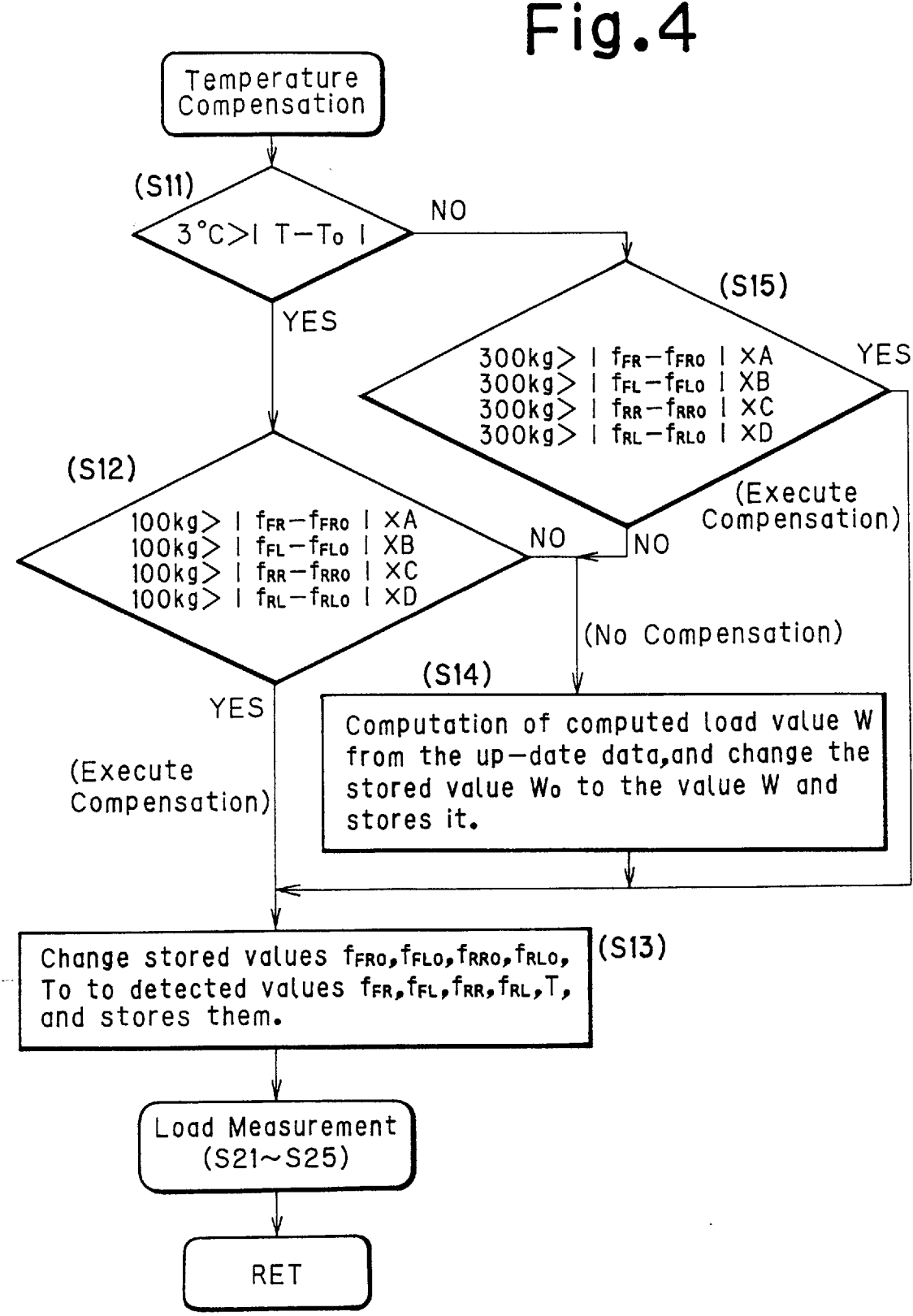
FIG. 4 is a flow chart showing an order of steps taken for effecting the temperature compensation.
Figure 5:
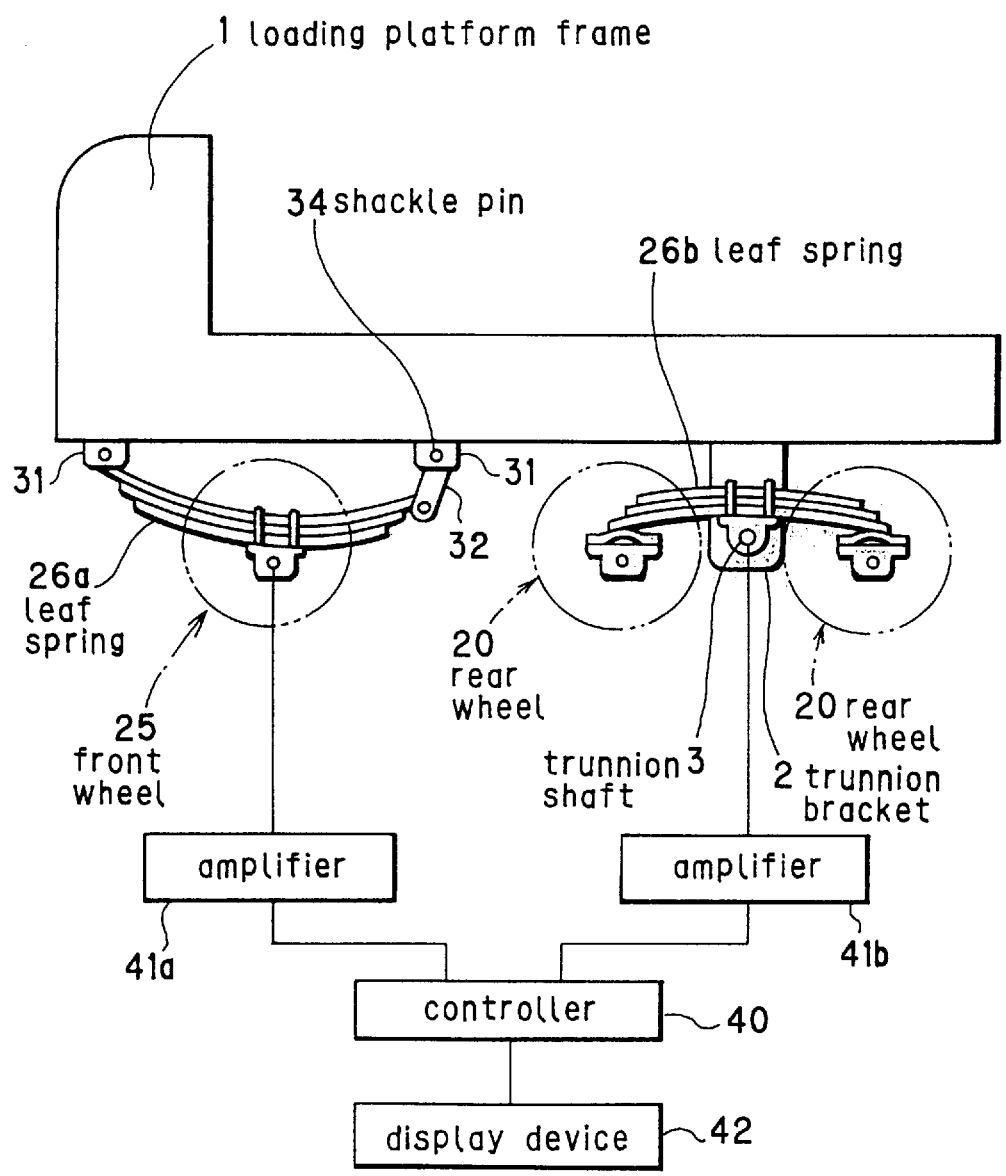
FIG. 5 is a structural view of an apparatus for measuring the vehicle load in a large vehicle to which the present invention is applied.

The following is the description of symbols used in FIG. 4.

$f_{FR}$: detection output (frequency) of the front right axle sensor inserted in the right shackle pin.

$f_{FL}$: detection output (frequency) of the front left axle sensor inserted in the left shackle pin.

$f_{RR}$: detection output (frequency) of the rear right axle sensor inserted in the right trunnion shaft.

$f_{RL}$: detection output (frequency) of the rear left axle sensor inserted in the left trunnion shaft.

$f_{FR0}$: stored value of the detection output of the front right axle sensor.

$f_{FL0}$: stored value of the detection output of the front left axle sensor.

$f_{RR0}$: stored value of the detection output of the rear right axle sensor.

$f_{RL0}$: stored value of the detection output of the rear left axle sensor.

T: current temperature.

$T_0$: stored temperature value.

$W_0$: stored computed load value (loadage).

W: currently stored computed load value (loadage) based on the up-dated detection output.

In the described embodiment, two different reference values are set to determine a degree of change in the sensor output caused by temperature changes, namely, a reference of 100 Kgf (a first threshold) for a temperature change smaller than 3° C. and a reference of 300 Kgf (a second threshold) for a temperature change greater than 3° C.

A flow of temperature compensation steps will be described based on FIG. 4. First, it is determined whether a difference ($|T-T_0|$) between the current temperature and the stored temperature value (the temperature of 30 minutes before) is smaller than the reference 3° C. or not by the detected data from the temperature sensor (S11). If the difference is smaller than 3° C., adopt the corresponding first threshold (100 Kgf), and if all of load changes $\lceil A \times |f_{FR}-f_{FR0}|$, $B \times |f_{FL}-f_{FL0}|$, $C \times |f_{RR}-f_{RR0}|$, $D \times |f_{RL}-f_{RL0}| \rfloor$ between the current detection outputs of the load sensors 7a, 7b and that of 30 minutes earlier are smaller than the first threshold (100 Kgf) (S12). Such changes are regarded as thermal expansion (or heat contraction) based on temperature changes, in other words, it is regarded that only the thermal expansion (or heat contraction) is produced in the load sensors 7a, 7b, respectively, but not regarded as caused by load changes. Then, the stored sensor output values of $f_{FR0}$, $f_{FL0}$, $f_{RR0}$, $f_{RL0}$ and the stored temperature value $T_0$ are changed to the current sensor outputs $f_{FR}$, $f_{FL}$, $f_{RR}$, $f_{RL}$, and temperature T, and stored. (S13)

In this manner, the value $W_0$ used in the Equation (1) in the load measuring routine is not up-dated, but only $f_{FR0}$, $f_{FL0}$, $f_{RR0}$ and $f_{RL0}$ are up-dated for calculating $\Delta f_{FR}$, $\Delta f_{FL}$, $\Delta f_{RR}$ and $\Delta f_{RL}$. Accordingly, values of $\Delta f_{FR}$, $\Delta f_{FL}$, $\Delta f_{RR}$, $\Delta f_{RL}$ become zero (0), and from the Equation (1) the stored computed load value $W_0$ is outputted as a computed value W. Thus, the computing equation is substantially compensated.

In other words, the temperature compensation is effected by storing the current sensor outputs corresponding to the previously stored computed value $W_0$.

In the case where any of the load changes $\lceil A \times |f_{FR}-f_{FR0}|$, $B \times |f_{FL}-f_{FL0}|$, $C \times |f_{RR}-f_{RR0}|$, $D \times |f_{RL}-f_{RL0}| \rfloor$ is greater than the first threshold (100 Kgf), the stored computed load value $W_0$ is changed to the up-dated computed load value W, and the up-dated value W is stored (S14), and, thereafter, the values $f_{FR0}$, $f_{FL0}$, $f_{RR0}$, $f_{RL0}$ are up-dated. (S13)

In this case, $W_0$, $f_{FR0}$, $f_{FL0}$, $f_{RR0}$, $f_{RL0}$ are up-dated simultaneously, and accordingly, the values at the time of obtaining the computed load value W are stored, which, will be used as reference values for the subsequent load measurement. However, since the timing of storing the computed values and the timing of the sensors outputs coincide with each other, no temperature compensation is made.

On the other hand, when the difference $|T-T_0|$ is greater than 3° C. (i.e the "NO" condition in the step S11), the second threshold (300 Kgf) set for this situation is adopted. Similar to the above-described steps, if any of the load changes corresponding to the currently detected outputs of the load sensors 7a, 7b from that of before 30 minutes are smaller than the second threshold (300 Kgf) (S15), it is regarded as only thermal expansion (or heat contraction) caused by temperature changes, and not regarded as caused by any load changes. Thus, the stored computed load value $W_0$ is not up-dated, but only $f_{FR0}$, $F_{FL0}$, $f_{RR0}$, $f_{RL0}$, $T_0$ are up-dated (S13), thereby the stored value $W_0$ is outputted as the up-dated computed load value, which indicates that the required temperature compensation has been made.

In the case where any of the load changes $\lceil A \times |f_{FR}-f_{FR0}|$, $B \times |f_{FL}-f_{FL0}|$, $C \times |f_{RR}-f_{RR0}|$, $D \times |f_{RL}-f_{RL0}| \rfloor$ is greater than the second threshold (300 Kgf), the value $W_0$ and the values $f_{FR0}$, $f_{FL0}$, $f_{RR0}$, $f_{RL0}$, $T_0$ are up-dated (S14, 13), and they will be used as reference values for the subsequent measurement. (No temperature compensation.)

Upon completion of the step S13, the above-described series of steps come to end, and, thereafter, when there is the command for effecting the temperature compensation process (after 30 minutes), the same steps will be executed again.

The present invention is not limited to the above-described embodiment, but the present invention may also be adopted in an arrangement where the load sensors are mounted to positions other than the above-described positions, or in a system of detecting an inner pressure of the air spring.

In the above-described embodiment, the temperature compensation is made based on the changes in the outputs of the sensors. However, the temperature compensation may be effected based on the change ($|W_0-W|$) in the computed load value.

Further, temperature sensors may be omitted, and, accordingly, setting of different threshold values for different ranges of temperature changes may also be omitted, thereby lowering the cost.

To effect the temperature compensation, other methods than the above-described embodiment may also be used.

For example, the previously obtained sensors detection outputs are stored, and load measurement values are obtained based on such stored values.

Or simply substitute the pre-stored load measurement values for the up-dated load measurement values.

As described above, according to the present invention, the output changes in the load sensors caused by temperature change can be easily compensated, and, thereby, an accurate measurement of a weight of goods on the vehicle, or the vehicle weight, can be always achieved.

What is claimed is:

1. In a vehicle load information measuring apparatus, comprising:
    load sensors mounted on members which receive a weight of a vehicle to detect the vehicle load information;
    memory means for storing load detection signals detected by the at least one load sensor; and
    load information control means for computing a load information by a predetermined computing equation based on load detection signals stored in the memory means and outputting a resulted value as a computed load value of the vehicle,
    wherein the load information control means computes a first load information based on first load detection signals detected at a first predetermined point of time and stores said computed first load information, computes a second load information based on second load detection signals detected at a second point of time which is after the lapse of a predetermined time from the first point of time, computes at least one of changes between the first load detection signals and the second load detection signals and a change between the first load information and the second load information, and if said at least one of computed changes between the first and second load detection signals and the computed change between the first and second load information are below a first predetermined value, the computation made according to the predetermined computing equation is compensated so that the computed load value to be outputted at the second point of time is not up-dated to the second load information.

2. A vehicle load information measuring apparatus according to claim 1, wherein the load information control means maintains the first load information as the computed load value outputted at the second point of time.

3. A vehicle load information measuring apparatus according to claim 1, wherein the load information control means repeatedly computes at least one of the changes between the first and second load detection signals and the change between the first and second load information at every predetermined time interval.

4. A vehicle load information measuring apparatus according to claim 1, wherein the load sensors in plural are mounted on the vehicle, and the load information control means effects the compensation when the all the changes between the first and second load detection signals determined based on outputs from the load sensors are below the first predetermined value.

5. A vehicle load information measuring apparatus according to claim 1 further comprising:
    temperature detection means for detecting the temperature around the load sensors, and
    wherein, when a change of temperature between a first temperature detected at the first point of time and a second temperature detected at the second point of time is above a third predetermined value, the load information control means compares at least one of the changes between the first and second load detection signals and the change between the first and second load information with a second predetermined value, which is greater than the first predetermined value, instead of comparing with the first predetermined value.

6. A vehicle load information measuring apparatus according to claim 5, wherein the load sensors in plural are mounted on the vehicle, and the load information control means effects the compensation when all the the changes between the first and second load detection signals determined based on outputs from the load sensors are below the second predetermined value.

7. A vehicle load information measuring apparatus according to claim 3, wherein the predetermined computing equation is defined to compute the second load information based on the first load information and the changes between the first and second load detection signals.

8. A vehicle load information measuring apparatus according to claim 7, wherein the load information control means effects the compensation such that the changes between the first and second load detection signals become zero (0).

9. A vehicle load information measuring apparatus according to claim 8, wherein the load information control means up-dates the first load detection signals stored in the memory means to the second load detection signals ($f_{FR}, f_{FL}, f_{RR}, f_{RL}$).

10. A method of measuring a vehicle load, comprising:
    detecting first load information indicative of a vehicle load at a first point of time by a load detection sensor;
    storing said detected first load information;
    detecting second load information indicative of the vehicle load at a second point of time after said first point of time by the load detection sensor;
    calculting a difference between said first and second load information;
    comparing said calculated difference with a first predetermined value;
    replacing said stored detected first load information with said second load information when said calculated difference is smaller than the first predetermined value; and
    calculating a vehicle load value based on said replaced second load information.

11. The method of claim 10, further comprising:
    detecting first temperature information indicative of a temperature of said load detection sensor at the first point of time;
    detecting second temperature information indicative of a temperature of said load detection sensor at the second point of time;
    determining whether a difference between said first and second temperature information with a second predetermined value; and
    executing said comparing step when said determined difference is smaller than said second predetermined value.

12. The method of claim 11, further comprising:

comparing said calculated difference with a third predetermined value in place of comparing said calculated difference with said first predetermined value when determined difference between said first and second temperature information is smaller than said second predetermined value.

13. The method of claim 10, further comprising:

calculating the vehicle load value based on the calculated difference between said first and second load information when said calculated difference between said first and second load information is greater than the first predetermined value.

14. The method of claim 10, further comprising:

calculating the vehicle load value based on the calculated difference between said first and second load information when said calculated difference between said first and second load information is greater than the third predetermined value.

* * * * *